(12) United States Patent
Eitzmann et al.

(10) Patent No.: US 7,681,077 B1
(45) Date of Patent: Mar. 16, 2010

(54) GRAPHICS SYSTEM WITH REDUCED SHADOWED STATE MEMORY REQUIREMENTS

(75) Inventors: Gregory M. Eitzmann, Palo Alto, CA (US); John S. Montrym, Los Altos, CA (US); Richard A. Silkebakken, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 803 days.

(21) Appl. No.: 11/556,630

(22) Filed: Nov. 3, 2006

(51) Int. Cl.
*G06F 11/00* (2006.01)

(52) U.S. Cl. .............................. 714/21; 714/20; 714/37; 714/39; 714/49

(58) Field of Classification Search .................... 714/20, 714/21, 37, 39, 49; 711/162, 165
See application file for complete search history.

(56) References Cited

U.S. PATENT DOCUMENTS

| | | | | |
|---|---|---|---|---|
| 5,905,854 A | * | 5/1999 | Nielson et al. | 714/6 |
| 6,323,870 B1 | * | 11/2001 | Newhall, Jr. | 345/582 |
| 6,819,327 B2 | * | 11/2004 | Wasserman et al. | 345/581 |
| 7,162,716 B2 | * | 1/2007 | Glanville et al. | 717/151 |
| 7,360,118 B1 | * | 4/2008 | Fesler | 714/36 |
| 2005/0257092 A1 | * | 11/2005 | Alexander et al. | 714/37 |

* cited by examiner

*Primary Examiner*—Michael C Maskulinski
*Assistant Examiner*—Charles Ehne
(74) *Attorney, Agent, or Firm*—Cooley Godward Kronish LLP

(57) ABSTRACT

A graphics processing unit has a reduced memory space shadow memory as a source of state information for performing validation of commands. The reduced memory space shadow memory is smaller in size than a full version of state variables associated with an abstract state machine representation of a class of commands received from a software driver.

20 Claims, 5 Drawing Sheets

GRAPHICS SYSTEM WITH REDUCED SHADOWED STATE MEMORY REQUIREMENTS

FIELD OF THE INVENTION

The present invention is generally related to techniques for shadowing state information in a graphics system. More particularly, the present invention is directed towards reducing the size of a shadow memory used to detect exceptions generated in response to commands of a graphics driver in a graphics system.

BACKGROUND OF THE INVENTION

A graphics processing unit (GPU) of a graphics system may include a memory to shadow state information. As one example, graphics hardware may include error-checking logic to identify exceptions generated by illegal commands issued by a graphics driver. Such error-checking logic is useful, for example, to debug driver software during software development. The error-checking logic may require state information to be shadowed. However, a shadowed state memory increases the cost of a GPU. As the complexity of GPUs continues to increase, the memory required to shadow state information is likely to increase.

Therefore, in light of the problem described above the apparatus, system, and method of the present invention was developed.

SUMMARY OF THE INVENTION

A graphics processing unit includes validation logic that requires a local source of state information to validate incoming commands. An incoming class of commands has an associated full set of state variables. The validation logic utilizes a reduced memory space shadow memory storing a representation of state information for performing validations of the class of commands that is smaller in size than a full set of state variables.

In one embodiment, a graphics processing unit has a graphics pipeline. A front-end acts as an interface to map a class of commands received from a software driver to a series of instructions for the graphics pipeline. The class of commands has a corresponding abstract state machine representation that includes a set of state variables. Validation logic associated with the front-end checks the validity of input commands from the software driver. A reduced memory space shadow memory is coupled to the validation logic. The reduced memory space shadow memory stores a representation of state information for performing validations of the class of commands that is smaller in size than a full version of the set of state variables. The validation logic utilizes the reduced memory space shadow memory as a source of state information for performing validation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
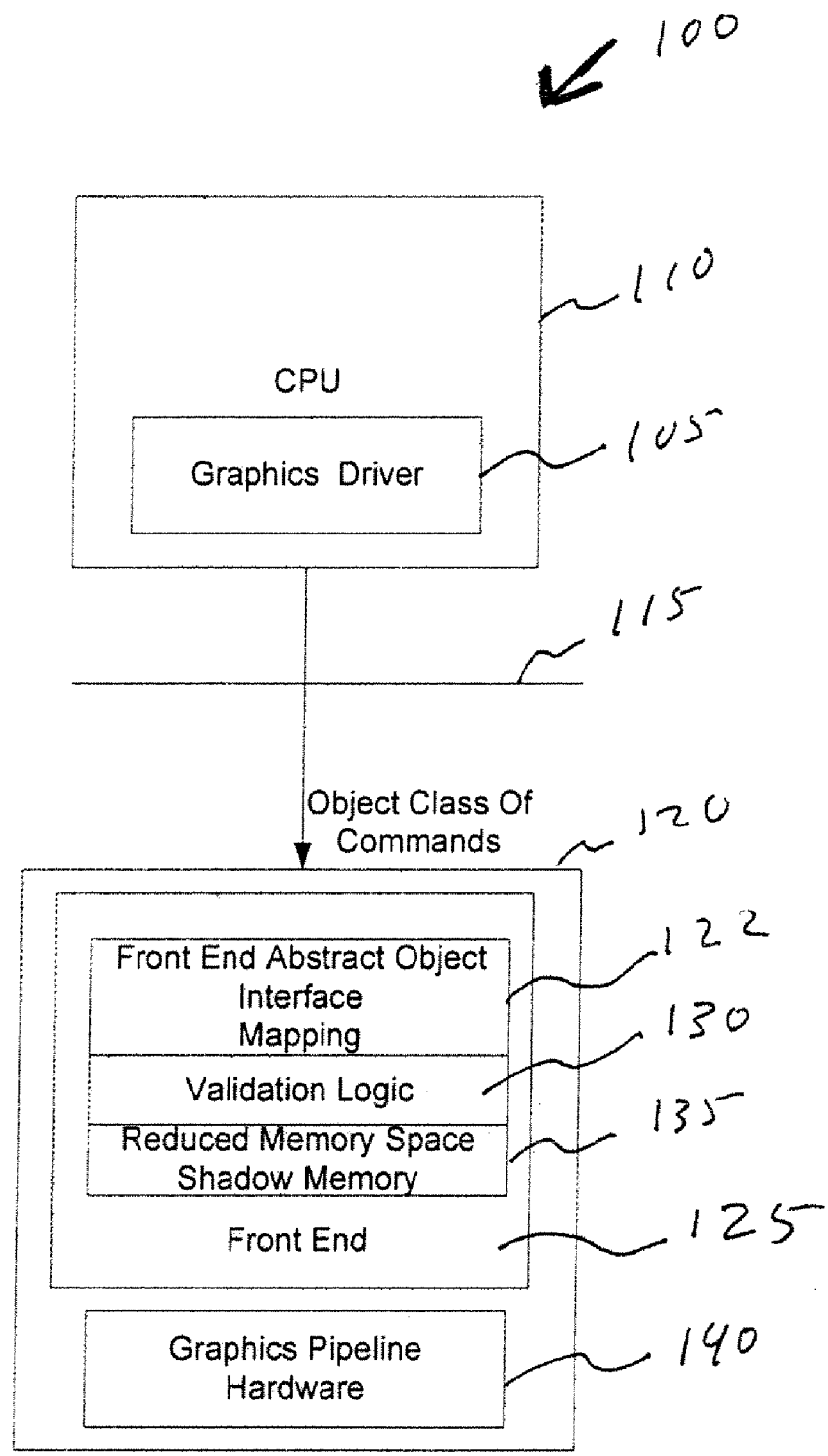
FIG. 1 illustrates a graphics system having a reduced memory space shadow memory in accordance with one embodiment of the present invention.

FIG. 1 illustrates a graphics system 100 in accordance with one embodiment of the present invention. A graphics driver 105 executes on a central processing unit (CPU) 110 and generates graphics commands. Graphics driver 105 may be implemented as software code stored on a computer readable medium. CPU 110 is coupled to a graphics processing unit (GPU) 120 via an interface 115, such as a bridge element. GPU 120 includes a front end command processor (hereinafter "front end") 125 that receives commands and translates commands into instructions for graphics pipeline 140, validation logic 130 associated with front end 125, and a reduced memory space shadow memory 135 associated with validation logic 130. As described below in more detail, reduced memory space shadow memory 135 has a smaller memory size than a conventional shadow memory that stores a full representation of all state variables.

In one embodiment, graphics system 100 is object-oriented in that the behavior of the graphics system is determined by an abstract object model of behavior from which hardware and software may be designed to work together to implement desired behavior. Front end 125 may, for example, include hardware that acts as an abstract interface 122 that maps one or more classes of commands to the physical implementation of graphics pipeline 140. Each class is a collection of commands and may also have associated memory storage rules.

In an object-oriented implementation all behavior is a function of an abstract object state model. Each object is an instantiation of a class with its own copy of state. For example, an implementation may define a hierarchy of object relationships such as device, channel, context, and rendering classes. As an illustrative example, an object may have a class of commands defining behavior such as setting the context of direct memory access (DMA) handles, target offsets of render surfaces; shader constant tables; offsets of a texture sampler; shader stage tables; cull, clip, scissor parameters; alpha, stencil, and depth tests; blend operation, logic operation, and write masks; and quality and performance knobs. As an illustrative example, an individual command within a class may, for example, be an action method that causes a report, semaphore release, vertex and attribute input, point, line polygon drawing, color, zeta, clip ID clear, or rendering predicated by a memory value. Examples of object state include states associated with pointers to memory, control fields written by state setting methods, contents of internal memories such as constant buffers, storage for rendering side effects such as line stipple phase, contents of primitive assembly, and transient state, such as shader program temporary registers.

In one embodiment an individual command is an atomic unit of input to a class. A command may, for example, have address bits identifying a mode of operation and payload bits corresponding to a data payload having at least one field of bits. In one embodiment an individual command may write to the stored state of an object, or may launch an action. In one embodiment, an address field has eleven bits and a payload field has thirty-two bits.

An object-oriented implementation of graphics system 100 provides several advantages. First, it permits the development of hardware and software to proceed in parallel. Second, the object-oriented model supports complex behavior. Third, a GPU 120 may be designed to support more than one class of objects, enabling a single GPU 120 to be compatible with different modes of operation.

One issue associated with graphics system 100 is the design and operation of graphics driver 105. Graphics driver 105 may, for example, generate a large set of possible commands. Each individual command should be a legal command for the class. Additionally, sequences of commands should also be legal. An illegal command or an illegal sequence of commands has the potential to cause a chip to "hang" or generate some other undesired behavior. Consequently, a graphics driver 105 that implements a complex object behavior requires debugging during a design phase to correct software errors. Additionally, since debugging of complex software may not always be perfect, there is also the issue of responding to any remaining driver bugs during normal operation of GPU 120.

In one embodiment validation logic 130 detects illegal commands and generates an exception for invalid commands. Validation is the process of verifying that an incoming command is legal. Validation may, for example, include a check for unknown commands, single field checks, multi-field checks, a check that primitives are launched with correct state that may have been transmitted using multiple commands, and memory limit violations. Validation also inherently include checks that a command is legal in light of allowed state transitions.

In one embodiment validation logic 130 includes validation checks based on validation statements of a validation language. For example, an individual validation statement may include one or more logical tests on state variables, such as a logical test on state variables A, B, and C (e.g., A+B+C>0). More generally, the validation checks may include a set of conditional tests performed on the state variables of the object class.

An individual command may include payload data having fields for one or more of the state variables required to perform a validation check on the command. For example, with a 32 bit payload, state variable fields may be included corresponding to two or more fields, such as fields for hexadecimal state variable values. However, more generally a validation check on an individual command may also require state variables not present in the individual command.

Reduced memory space shadow memory 135 is provided to store state information for validation logic 130 to perform validation checks. In one implementation, reduced memory space shadow memory 135 is implemented as a set of flip-flops to facilitate high-speed validity checks. Flip-flops permit state information to be immediately available. In contrast, random access memory (RAM) is slower in that a number of read cycles are required to access a set of state information from RAM.

As an illustrative example, an individual command received by front end 125 is checked by validation logic 130. Validation logic 130 accesses any state information required to perform a validity check from reduced memory space shadow memory. If the validity check passes, the state of reduced memory space shadow memory 135 is updated and front end 125 maps the valid command to one or more instructions which are then issued to graphics pipeline 140. However, if validation logic 130 determines that the command is invalid, an exception is generated. The exception is preferably reported to graphics driver 105, as discussed below in more detail. Additionally, an exception does not result in the state of reduced memory space shadow memory 135 being advanced or in instructions being sent to graphic pipeline 140.

Reduced memory space shadow memory 135 preferably corresponds to a minimum memory size required to store a representation of state information sufficient to perform validation. However, more generally, any reduction in size over a full representation of object state is contemplated. In one implementation, reduced memory space shadow memory 135 shadows a representation of state information having a memory size less than that required to store the full state variable values for a full set of state variables 1, 2, 3, 4 . . . N. That is, reduced memory space shadow memory 135 is designed to reduce the shadow memory size required to perform validation.

The validation process performed by validation logic 130 checks that an incoming command (or sequence of commands) are legal commands, i.e., commands consistent with the intended object behavior. Consequently, a set of validation checks needs to be generated based on the state variables. In one embodiment, semantic processing is performed during a design phase of GPU 120 to determine validation checks that need to be performed and to also identify potential reductions in shadow memory requirements required to perform validation checks. The semantic processing may, for example, analyze explicit and implicit state variable dependencies in a set of validation checks for a class of commands and determine one or more state variables that do not need to be shadowed to perform a validation.

In another embodiment, semantic processing is performed during the design phase of GPU 120 to determine if a more compact translated form of a state variable may be used to perform validity checks. Thus, a state variable A may be translated into a more compact form A' which is stored in reduced memory space shadow memory 135. When a validity check is performed, validation logic 130 may either use the translated form directly or perform an inverse translation required to convert A' back into A. For example, suppose state variables are implemented in a hexadecimal representation. A logical statement may, for example, be implemented as a logical condition in which state variables are compared to specific hexadecimal values, such as the logical statement: if A==0×12052, then error A. However, if there are only a subset of state values that are valid/invalid then a more compact representation may be achieved by translating state variables into the more compact representation for storage. For example, 0×11077→1, 0×11096→2, 0×12052→3. In this example, the validity check if A==0×12052, then error A may be implemented using translated state variables as A'==3, then error A.

In one embodiment, semantic processing is performed to determine if alternate forms of validity checks reduce shadow memory requirements. For example, an input command may include one or more state variables. As previously described, a given validity check may include explicit and implicit state variables. The objective of a validity check is to confirm that a command, or a sequence of commands, results in the proper object behavior. Semantic processing may be performed to determine if alternate forms of a validity check reduce shadow memory requirements. For example, a logical condition A+B>0 has an alternate form A−(−B)>0.

Figure 2:
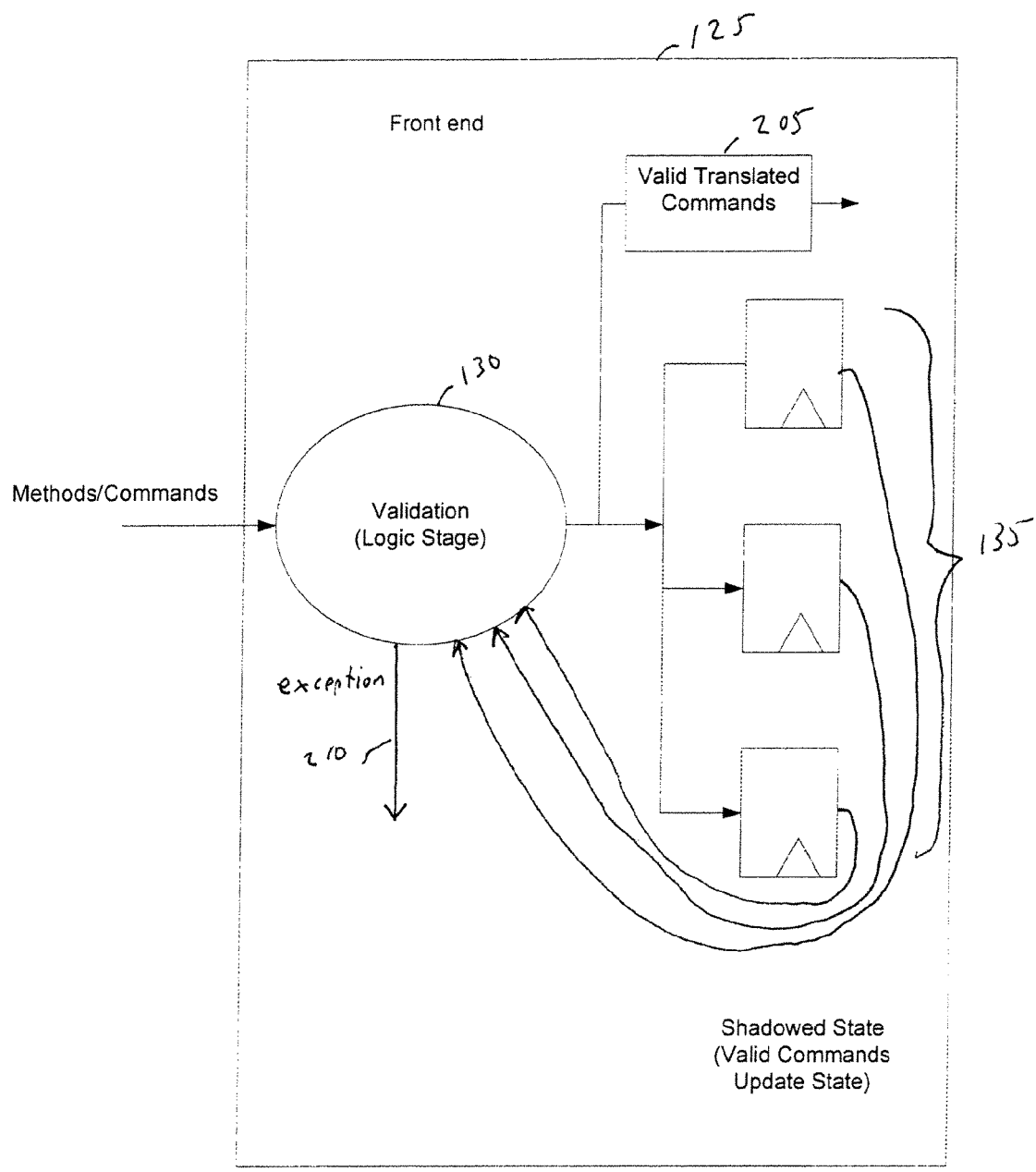
FIG. 2 illustrates a front end having a reduced memory space shadow memory in accordance with one embodiment of the present invention.

FIG. 2 is a block diagram illustrating a portion of front end 125 in accordance with one embodiment. Commands (also known as methods) arrive at front end 125. Validation logic 130 within front end 125 performs validity checks. Reduced memory space shadow memory 135 is implemented as set of flip-flops. Additionally, a functional block 205 is included to translate valid commands into instructions for the graphics pipeline 140. As illustrated by the arrows, commands which are valid result in an update of the shadowed state information. In turn, validation logic 130 draws state information from reduced state shadow memory 135 to perform validity checks and to identify exceptions. Invalid commands that fail a validity check result in the generation of exception signals 210, which may be reported to other components or to a software entity, such as a portion of graphics driver 105.

Figure 3:
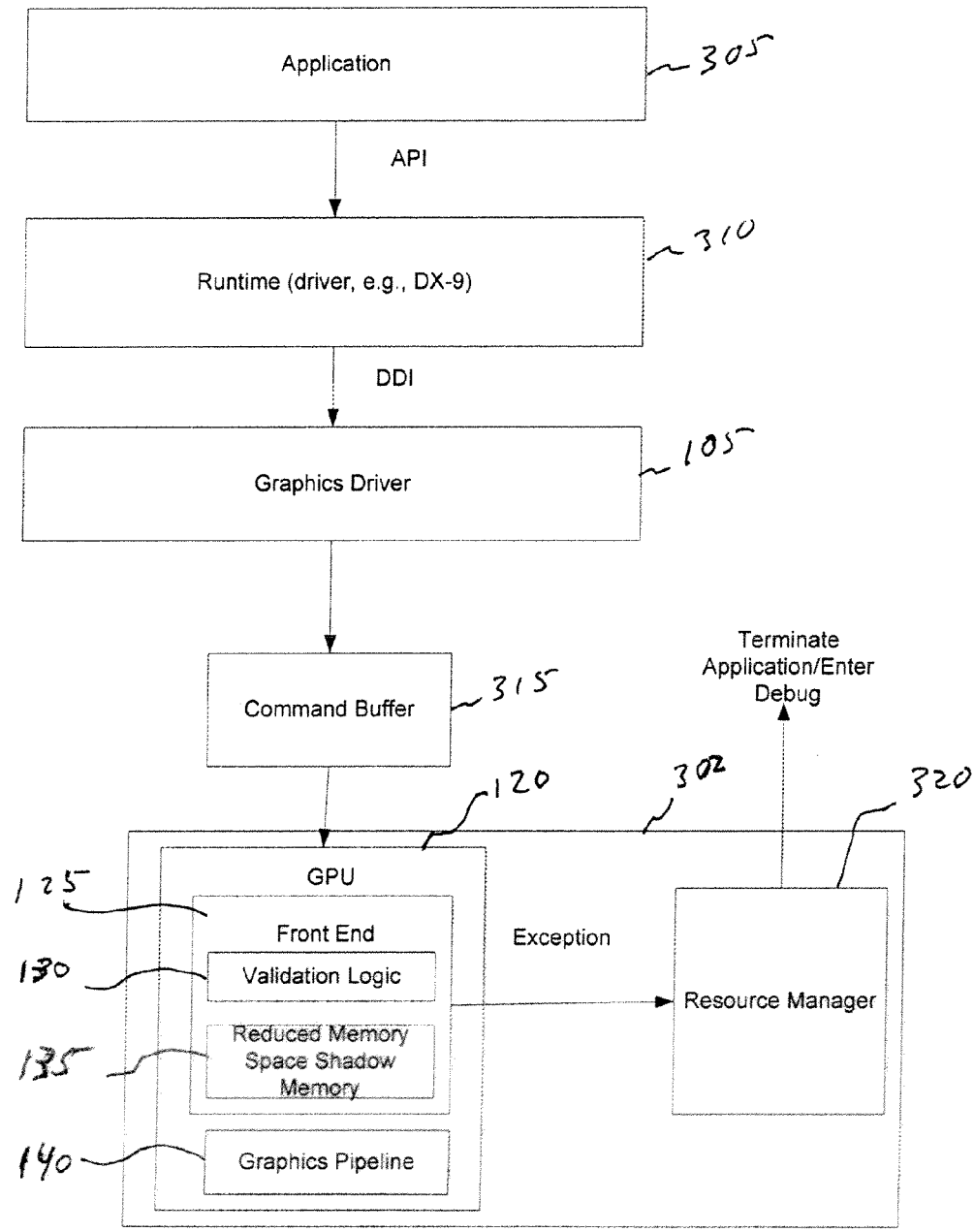
FIG. 3 illustrates a combined hardware/software stack representation of a graphics system in accordance with one embodiment of the present invention.

FIG. 3 illustrates a hardware/software depiction of debugging for a specific instance 302 of an object class. A graphics application 305 utilizes a graphics API. A runtime driver 310 is included. A command buffer 315 is provided to buffer commands issued from graphics driver 105. A resource manager 320 is a privileged software driver component that receives exceptions. Resource manager 320 may, for example, make a decision to enter a debug mode or to terminate an application. Additionally, in one embodiment resource manager 320 handles corner cases that hardware can't handle. In one embodiment resource manager 320 manages allocation of memory, object instances, and hardware resources. Additionally resource manager 320 may read and write privileged hardware registers in GPU 120.

Figure 4:
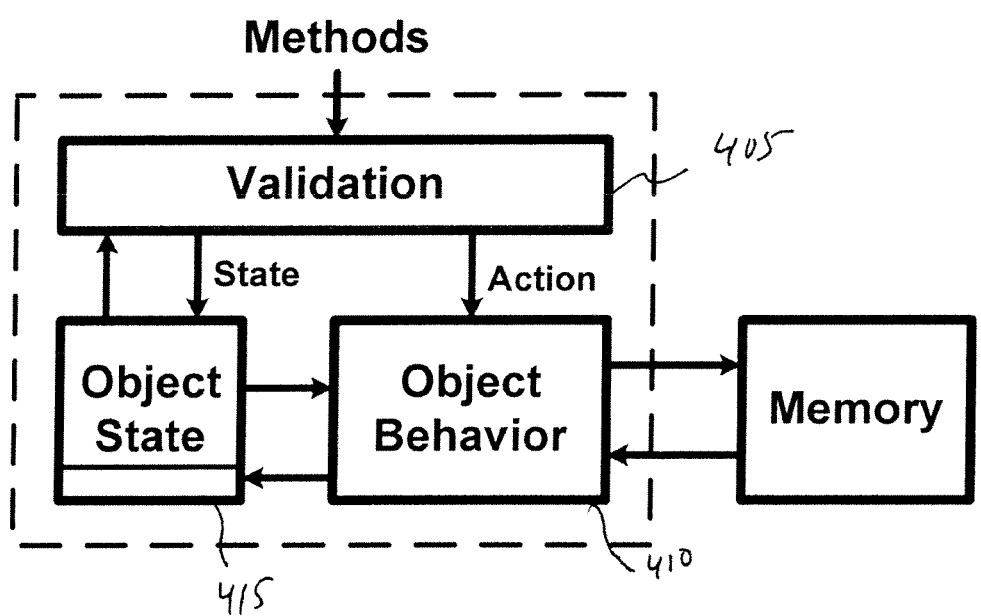
FIG. 4 illustrates an abstract object class representation of a graphics processor in accordance with one embodiment of the present invention.

The design of validation logic 130 and reduced memory space shadow memory 135 requires a class abstract view and hardware implementation details. Referring to FIG. 4, a class abstract view of a validation process is that commands ("methods") are received for validation 405. A valid command initiates an action consistent with the object behavior 410. Each object also has an object state 415. This class abstract view permits, for example, abstract validation checks to be created to confirm that commands are consistent with the object behavior 410 associated transitions to object state 415. However, the level of abstraction of the class abstract view is such that object state 415 corresponds to a full set of object state.

Figure 5:
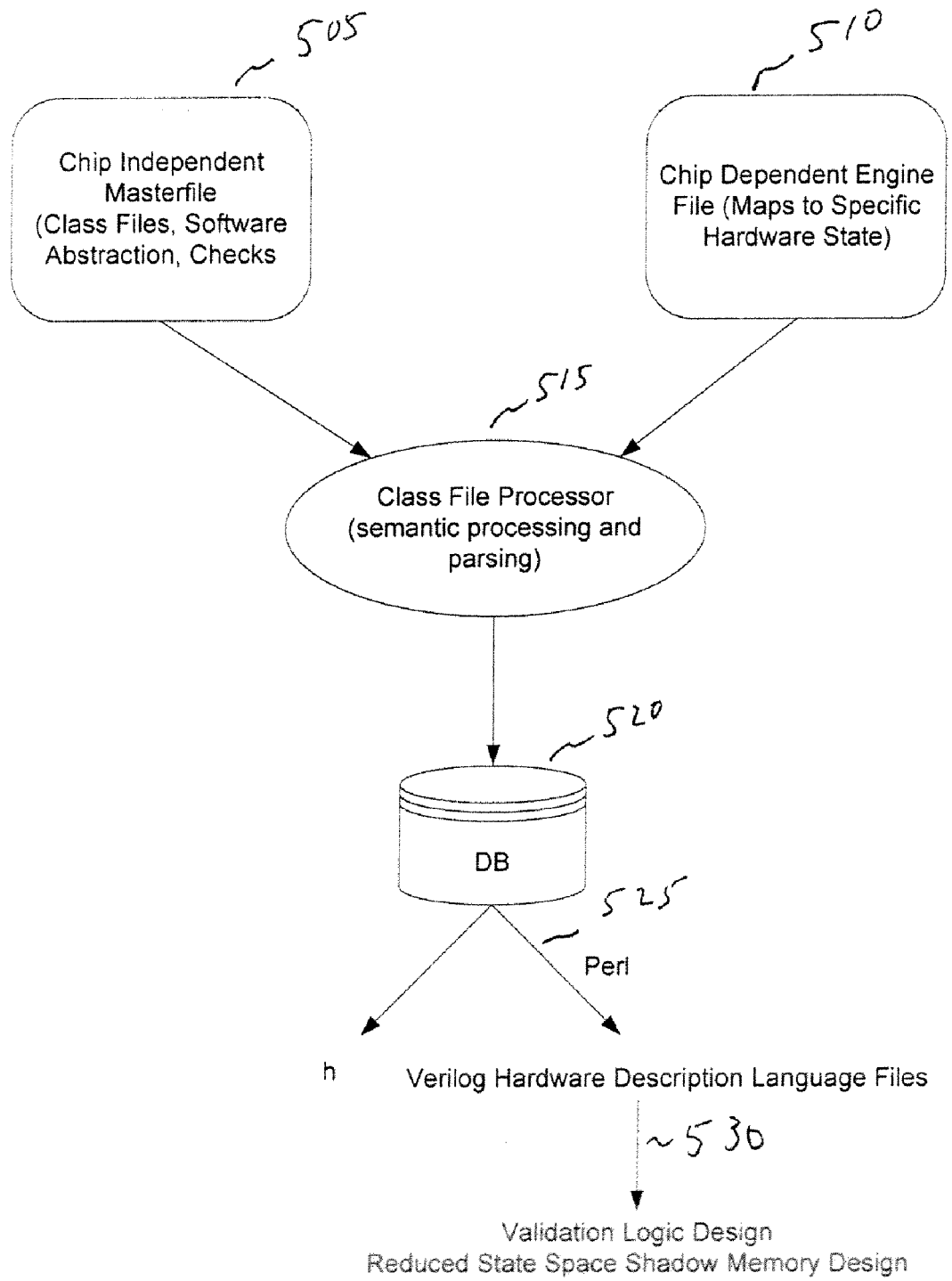
FIG. 5 illustrates a system for performing class processing to reduce the size of a shadowed state memory in accordance with one embodiment of the present invention.

FIG. 5 illustrates a system for designing a reduced memory space shadow memory 135. A master file 505 includes class files defining attributes of classes, software abstractions (e.g., class abstract views), and checks (e.g., abstract validity checks). As an illustrative example, master file 505 may describe one or more object classes with each object class having its own abstract machine object state, object behavior, and high-level object validation. Master file 505 expresses a chip-independent definition of object behavior. Engine file 510 describes attributes of the graphics hardware used to implement a graphics pipeline. Engine file 510 is specific to a particular baseline design of a graphics pipeline and is thus chip dependent. Engine file 510 provides, for example, implementation details required to map abstract commands into specific instructions for a particular graphics pipeline hardware design. A class file processor (CFP) 515 receives master file 505 and engine file 510. CFP 515 performs semantic processing and parsing to optimize the size of the reduced memory space shadow memory 135. In one embodiment, CFP 515 examines explicit and implicit states required to perform validity checks and determines if only a subset of the full set of object states needs to be shadowed. Additionally, in one embodiment CFP 515 determines if translated states may be shadowed instead of the actual state. Other optimizations may be performed by CFP such as determining alternate formats of validity checks to minimize shadowed memory requirements. CFP 515 generates database files 520. The database files 520 are then used to generate files for the graphics system, such as .c and .h header files. The database files 520 may be stored on a computer readable medium. As one example, the Perl programming language may be used to generate a Verilog Hardware Description Language (HDL) file of the front end 125 from database 520, including validation logic 130 and reduced memory space shadow memory 135. The Verilog file may, in turn, be used to implement the logical design of front end 125 used to fabricate GPU 120. The Verilog file may, for example be stored on a computer readable medium.

In one embodiment, the system supports idempotence and the state is arranged such that all state commands are idempotent as a fundamental part of the process. Idempotence is a well-known mathematical concept in which an operation produces the same result regardless of whether the operation is performed once or multiple times. Idempotent state commands can be sent in any order and any number of times and the resulting machine state will be the same." However, it will be understood that idempotence is an implementation option and not a requirement for practicing the present invention.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics processing unit, comprising:
   a graphics pipeline;
   a front-end acting as an interface to map a class of commands received from a software driver to a series of instructions for said graphics pipeline, said class of commands having a corresponding abstract state machine representation that includes a set of state variables;

validation logic associated with said front-end to check the validity of input commands from said software driver;

a reduced memory space shadow memory coupled to said validation logic, said reduced memory space shadow memory storing a representation of state information for performing validations of said class of commands that is smaller in size than a full version of said set of state variables;

said validation logic utilizing said reduced memory space shadow memory as a source of state information for performing validation.

2. The graphics processing unit of claim 1, wherein said reduced memory space shadow memory stores a copy of a subset of said set of state variables selected to eliminate at least one redundant state variable not semantically required for performing validation of said class of commands.

3. The graphics processing unit of claim 1, wherein said reduced memory space shadow memory stores a translated version of a state variable to reduce memory storage requirements.

4. The graphics processing unit of claim 3, wherein said validation logic performs an inverse translation on said translated version of a state variable to recover said state variable.

5. The graphics processing unit of claim wherein said translated version of a state version is a bit code representing a state variable.

6. The graphics processing unit of claim 2, wherein said reduced memory space shadow memory stores a representation of state variables sufficient to determine explicit and implicit semantic state variables used in validation statements of a validation language used to perform validation.

7. The graphics processing unit of claim 1, wherein said reduced memory space shadow memory stores a set of states corresponding to a semantically minimal set of states required to perform validation.

8. The graphics processing unit of claim 1, wherein said validation logic performs at least one conditional test on one or more representations of state variables.

9. The graphics processing unit of claim 1, wherein said reduced memory space shadow memory comprises flip-flops.

10. The graphics processing unit of claim 1, wherein said validation logic reports exceptions to a software component.

11. A graphics system, comprising:

a graphics driver to issue a sequence of graphics commands belonging to a class of commands, said class of commands having a corresponding abstract state machine representation that includes a set of state variables;

a graphics processing unit communicatively coupled to said graphics driver, said graphics processing unit comprising:

a graphics pipeline;

a front-end to receive commands from said graphics driver, said front-end acting as an interface to map said class of commands to a series of instructions for said graphics pipeline;

validation logic to check the validity of input commands received from said software driver;

a set of flip-flops coupled to said validation logic to act as a reduced memory space shadow memory, said set of flip-flops storing a representation of state information for performing validation of said class of commands that is smaller in size than a full version of said set of state variables;

said validation logic utilizing said reduced memory space shadow memory as a source of state information for performing validation.

12. The graphics processing unit of claim 11, wherein said reduced memory space shadow memory stores a copy of a subset of said set of state variables selected to eliminate at least one redundant state variable not semantically required for performing validation for said class of commands.

13. The graphics processing unit of claim 11, wherein said reduced memory space shadow memory stores a translated version of a state variable to reduce memory storage requirements.

14. The graphics processing unit of claim 13, wherein said validation logic performs an inverse translation on said translated version of a state variable to recover said state variable.

15. The graphics processing unit of claim 13, wherein said translated version of a state version is a bit code representing a state variable.

16. The graphics processing unit of claim 11, wherein said reduced memory space shadow memory stores a representation of states sufficient to determine explicit and implicit semantic state variables used in validation statements of a validation language to perform validation.

17. The graphics processing unit of claim 11, wherein said reduced memory space shadow memory stores a set of states corresponding to a semantically minimal set of states required to perform a validation check using validation statements of a validation language.

18. The graphics processing unit of claim 11, wherein said validity logic performs at least one conditional test on one or more state variables.

19. The graphics processing unit of claim 11, wherein said validation logic reports exceptions to a driver component.

20. A method of operating a graphics processor, comprising:

shadowing state variables for use in performing validity checks by storing a reduced memory space shadow memory representation of a set of state variables of a class of commands for performing validity checks, said reduced memory space shadow memory representation being smaller in size than a full version of said set of state variables; and in response to an input command, performing a validation using said reduced memory space shadow memory representation.

* * * * *